United States Patent
Lagadec et al.

(10) Patent No.: US 7,356,133 B2
(45) Date of Patent: Apr. 8, 2008

(54) METHOD AND SYSTEM FOR ANONYMOUSLY TRANSMITTING MESSAGES BY MEANS OF A TELECOMMUNICATION NETWORK

(75) Inventors: Roger Lagadec, Regensdorf (CH); Eric Lauper, Bern (CH)

(73) Assignee: Swisscom Mobile AG, Bern (CH)

( * ) Notice: Subject to any disclaimer, the term of this patent is extended or adjusted under 35 U.S.C. 154(b) by 308 days.

(21) Appl. No.: 10/833,535

(22) Filed: Apr. 28, 2004

(65) Prior Publication Data

US 2005/0025300 A1 Feb. 3, 2005

Related U.S. Application Data

(63) Continuation of application No. PCT/CH01/00641, filed on Oct. 29, 2001.

(51) Int. Cl.
H04M 1/64 (2006.01)
(52) U.S. Cl. .............. 379/88.23; 379/210.03; 455/415; 709/206
(58) Field of Classification Search ........... 379/210.03, 379/88.23; 455/410, 415; 709/206
See application file for complete search history.

(56) References Cited

U.S. PATENT DOCUMENTS 5,058,152 A 10/1991 Solomon et al.
6,161,129 A * 12/2000 Rochkind .................. 709/206
6,449,473 B1 * 9/2002 Raivisto .................... 455/410
6,553,110 B1 * 4/2003 Peng ..................... 379/210.03

FOREIGN PATENT DOCUMENTS

DE 196 38 072 A 3/1998
WO WO 01 60083 A 8/2001

OTHER PUBLICATIONS

Samfat, D. et al: Untraceability in Mobile Networks, Mobicom, Proceedings of the annual International Conference on Mobile Computing and Networking, Nov. 13, 1995.

* cited by examiner

*Primary Examiner*—Gerald Gauthier
(74) *Attorney, Agent, or Firm*—Pearne & Gordon LLP

(57) ABSTRACT

Method for anonymously transmitting a message by means of a telecommunication network. A first exchange (2) between the sender (1) and the receiver (4) of said message replaces identifying features (MSISDN) of the sender (1) of the message by a first alias identification (CID). The conversion between the said identifying features (MSISNDN) and the first alias identification (CID) is permanent, or at least secure for several weeks.

The first alias identification (CID) is replaced by a second alias identification (CMID) at the receiver (4) or in a further exchange (3). The second alias identification (CMID) enables the receiver to identify the transmitter.

29 Claims, 2 Drawing Sheets

METHOD AND SYSTEM FOR ANONYMOUSLY TRANSMITTING MESSAGES BY MEANS OF A TELECOMMUNICATION NETWORK

This application is a continuation of application PCT/CH01/00641 (WO03/039182), filed on Oct. 29, 2001, the contents of which are hereby incorporated by reference.

FIELD OF THE INVENTION

The invention relates to a method and system for transmitting a message, particularly requests, by means of a telecommunication network.

RELATED ART

Messages between a sender and a receiver in a telecommunication network are often forwarded over one or several exchanges. This is in particular the case for messages that contain a request from a mobile radio telephone user to a service provider. Many requests contain confidential information, for example the user's identity and location. This information is required by the receiver in order to answer the request. In this case, the operators of the different exchanges between the sender and the receiver can access confidential information that is not intended for them. For example, they can establish detailed movement profiles of the users, which on the one hand is not desirable for having the technology accepted and furthermore is questionable from the point of view of the provisions of data protection.

Methods are already known for encrypting messages from the sender to the receiver and for keeping them confidential vis-á-vis the operators of the exchanges. Such methods are mostly based on encryption technologies that require computational capacities not always available in the sender terminal. Furthermore, the forwarding of the messages in the exchanges is often made more difficult if the entire message is encrypted.

Furthermore, in certain cases, an encryption of the messages is neither necessary nor desired. It is for example already known that operators of exchanges establish statistical analyses of requests of the different senders. It is for example possible to determine the number of users from a certain country or the reaction to a certain advertising campaign. As long as no personal sender or receiver profiles are kept or made public, neither the senders nor the receivers have any objections thereto.

Methods are also known for anonymizing messages. In this case, all user-identifying features are replaced in a first exchange with a temporary alias identification; the message is anonymous vis-á-vis further exchanges and vis-á-vis the receiver, but remains readable.

Such anonymizing methods are however not suitable if the service provided by the receiver depends on the sender's identity. Many service providers offer for example special reductions or offers for loyal customers that could not be offered in an anonymous operation. Many service providers further keep user profile databases, in which for example the customer's preferred mode of payment or correspondence language is stored.

It is an aim of the present invention to propose a method and a system in which messages between a sender and a receiver in a mobile radio network are kept anonymous only vis-á-vis certain exchanges but not vis-á-vis the receiver of the message.

BRIEF SUMMARY OF THE INVENTION

According to the present invention, this aim is achieved in particular through the elements of the independent claims. Further advantageous embodiments arise from the dependent claims and the description.

In particular, this aim is achieved by identifying features of the message's sender being replaced in an exchange between the sender and the receiver with an alias identification, by the correspondence between the identifying features and the alias identification being secure for a time period that is long as compared with the average period between successive messages (for example several weeks), and by a correspondence between said alias identification and the features sufficiently qualifying to said receiver being known by said receiver.

Features sufficiently qualifying to said receiver are for example features with which the receiver can identify the sender, for example with his name and address. These could however also be features that do not allow a complete identification, but which are sufficient in the context of the transaction, for example features from which the receiver can derive a credit card number. Sufficiently qualifying features can for example consist of the customer numbers used by the receiver.

This has the advantage that the message is forwarded anonymously only vis-á-vis certain exchanges, but that the correspondence between the used alias identification and the sender is re-established at the receiver's.

Another advantage is that only the receiver is responsible for the quality of the business relationship with the sender. The operators of the exchanges do not need to agree on general conditions concerning the transaction; they act only as a message transmitter, not as a financial partner.

The invention can be used not only if the alias identification is anonymous, but also if it is incomprehensible or inconvenient for the sender.

According to the invention, this correspondence is determined during a registration procedure, during which the sender sends to the receiver a registration message with a secret associated to this sender.

This has the advantage that the correspondence between the alias identification and the corresponding sender must be established only once and is used for all further messages.

After the correspondence between the alias identification used by the first exchange and the identity of a specific sender has been established at the receiver's after the registration procedure, the receiver can recognize each further message from this sender.

Messages are forwarded to a specific receiver on the basis of a known correspondence in an exchange between either each possible message, or messages with a special syntax, and specific receivers.

DESCRIPTION OF THE DRAWINGS

Hereafter, an embodiment of the present invention will be described on the basis of an example. The example of the embodiment is illustrated by the following attached figures.

DETAILED DESCRIPTION OF THE INVENTION

Figure 1:
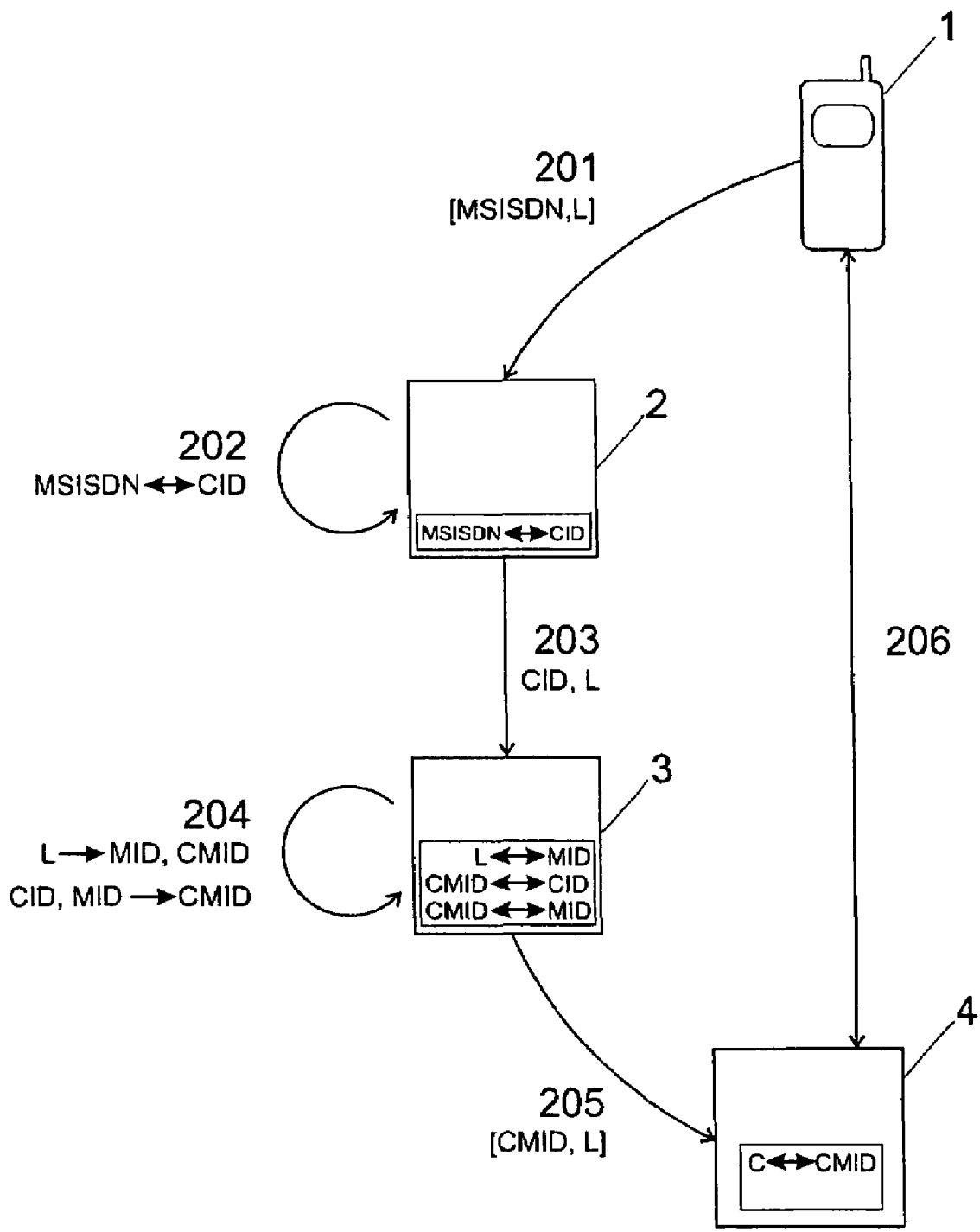
FIG. 1 shows a data flow diagram in which the possible procedure steps during the transmission of a message are represented schematically.
Figure 2:
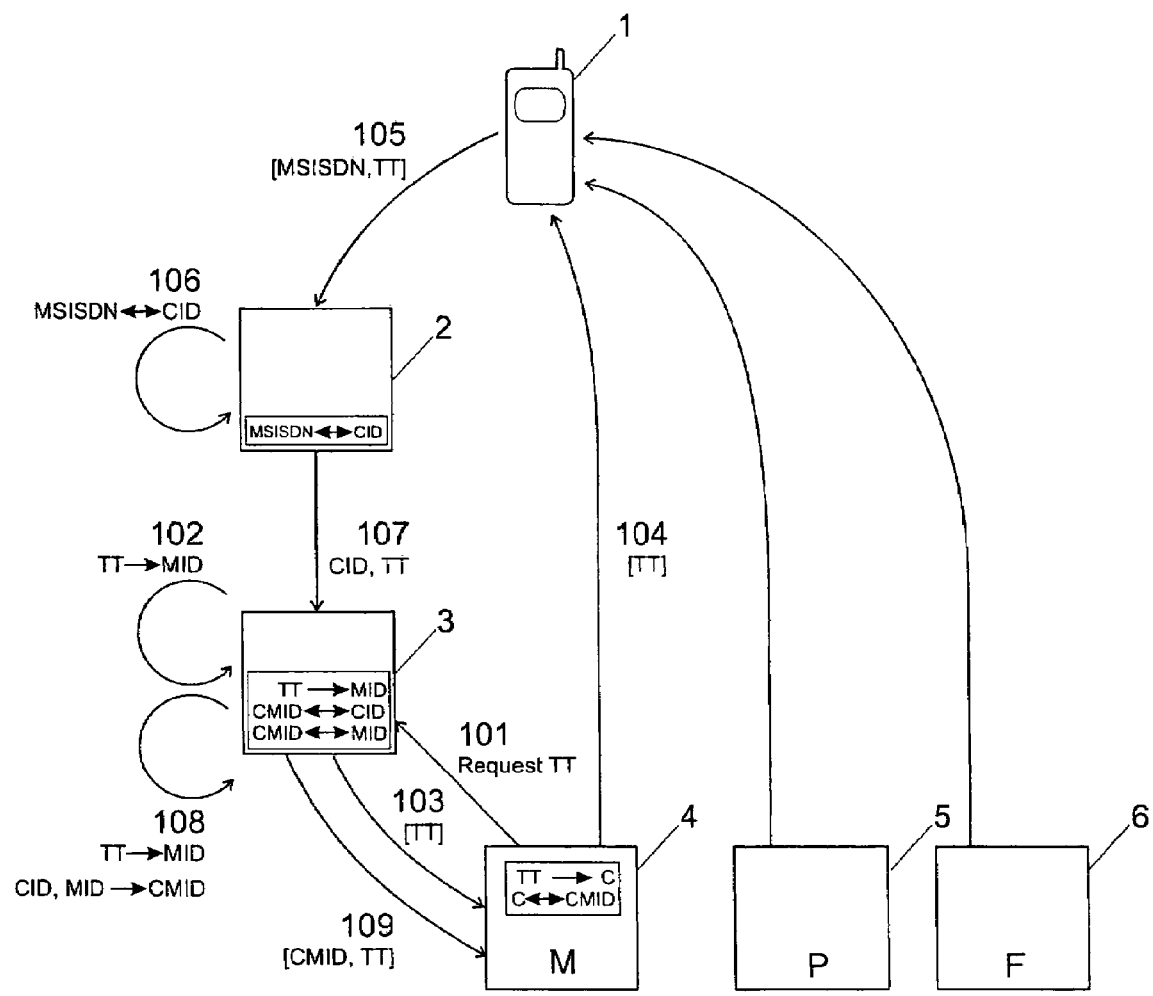
FIG. 2 shows another data flux diagram in which the possible procedure steps during the registration procedure are represented schematically.

In FIG. 1, the reference number 1 refers to a sender, for example a mobile radio telephone or a PDA (Personal Digital Assistant) with a connection to a telecommunication network. The telecommunication network can preferably be a mobile radio network, for example a GSM (Global System for Mobile Communications), GPRS (General Packet Radio System), HSCSD (High Speed Circuit Switched Data) or UMTS telephone (Universal Mobile Telecommunication System). The mobile radio telephone thus preferably has an identification card (not represented), for example a SIM card (Subscriber Identity Module), in which user-identifying data are stored.

The reference number 4 refers to the receiver of a message from the sender 1. The receiver consists preferably of a computer system, for example a web or WAP host, and is preferably administered by a service provider (for example a supplier of products or information). Other service providers are however also possible, for example a post office 5, a financial institute 6, an insurance company, a registration center, etc. An example of a financial institute 6 can be for example a bank or a credit card company.

The sender 1 contacts the receiver 4 in order to order a service, by a request L being typed on the keyboard of the mobile radio telephone or automatically entered and packed in a message 201 before being sent to the receiver 4. The message 201 is preferably transmitted as a USSD message (Unstructured Supplementary Service Data) and can thus be typed directly onto the keyboard of a mobile radio telephone without a menu having to be selected. USSD messages have the advantage that they are free of charge and transmitted without delay. The USSD messages contain a service code, for example 141, and a service number, for example 123456. Part of the service number, for example a prefix, in this case the prefix 123, preferably comes from a predefined series of numbers that are reserved for transactions with external receivers 4. Service numbers that are not contained within this predefined series are intended for further exchanges 3 or for other services. It is however also possible to forward all messages having a special syntax to a specific receiver, without having to establish correspondence tables between each possible message and the possible receivers 4.

An example of a USSD request L for a specific service could be for example

*141*123456#

The request L which has to be entered for accessing a certain service can be made known by the receiver in several ways, for example by being indicated on advertising supports of any kind, for example on prospectuses, in catalogues, announcements in the press media, TV adverts, internet pages, fax, outdoor advertising etc. or, in the case of a payment transaction, on invoices. It is also possible to indicate the request as a file in a digital data stream (for example as correspondence or sound accompanying data in a multimedia program). The request L can be recorded manually or automatically (for example with a scanner or a barcode reader) through the mobile radio telephone.

Apart from USSD messages, the messages 201 in the framework of the invention can also be sent for example as SMS message (Short Message System), as data package in a packet-switched network or as SS7 signaling message in an ISDN network.

The message 201 travels through a first exchange 2 serving as an interface between the mobile radio network in which the mobile radio telephone 1 is registered and the network (for example internet) with which the receiver computer is connected. The first exchange 2 consists preferably of a USSD handler that is administered by the operator of the mobile radio network in which the mobile radio telephone 1 is registered (preferably the operator that distributed the SIM card in the mobile radio telephone 1) and that forwards all received messages with a specific service code (for example 141) to a predefined further exchange 3. In case SMS or other messages are used instead of or in addition to USSD messages, the first exchange 2 can also consist of an SMS handler or another suitable interface.

User-specific data, for example a mailing, invoicing or electronic address, can be stored in the first exchange 2 and administered by the user 1 of the mobile radio telephone over USSD messages, SMS, WAP or a suitable web page. These data can be used in order to be able to send an answer of the service provider 4 to the sender 1 over a suitable reverse channel.

The first exchange 2 optionally also has the possibility of supplementing the message 201 with other data, for example with the time or with indications as to the sender's location.

At least one further exchange 3 is located logically between the first exchange 2 and the receiver 4. The further exchange 3 preferably consists of a platform (for example of an electronic marketplace) through which messages destined for different receivers 4, 5, 6 transit. Certain services can however also be offered directly by the further exchange 3. The further exchange 3 compares the prefix (for example 123) of the received message 203 with a predefined list and forwards the messages with a listed prefix on the basis of the service number (for example 123456) in the request L to the concerned receiver 4 identified with a MID number. It preferably also establishes statistics on forwarded messages (for example for marketing purposes). The results of the statistics are sent periodically to the concerned service providers 4 or can preferably be viewed by them on a secured internet page.

The one skilled in the art will understand that the first exchange 2 and the second exchange 3 can also be combined and administered by the same operator.

The receiver 4 receives the message 205 or retrieves it from the further exchange 3 and processes the request it contains. It can send an answer in the other direction over the same channel over the exchanges 3, 2 to the sender 1, using the user-specific data in the first exchange 2. The answer can be used for example to send to the requesting sender 1 additional information, an electronic entry card, a confirmation of a user selection or of a participation to a competition. The answer can preferably be dependent on an anonymous sender profile in the further exchange 3; the sender can adapt his personal profile via special messages or a website. For example, the preferred language, the used mobile radio telephone 1, the preferred answer channel etc. can be indicated in the profile.

It is desirable that the message 201 of the sender 1 should remain anonymous vis-á-vis the further exchange 3. This is in particular the case if the message contains information that is confidential or subjected to the provisions of data protection, for example the sender's location. On the one hand, many potential users 1 would scarcely accept that an exchange 3 administered by an unfamiliar authority should be informed about all their movements and order messages. On the other hand, the operator of this exchange 3 could find himself in a questionable position from the point of view of the provisions of data protection if such information of a large number of mobile subscribers 1 were available to him.

In order to solve this problem, all sender-identifying features are preferably removed in the first exchange 2 from the message 201 and replaced with an alias identification CID (step 202). In the case of a message 201 from a GSM mobile radio telephone, the MSISDN (Mobile Subscriber Identification Number) for instance is replaced in the exchange 2 with an alias identification CID. The correspondence between an MSISDN and a CID is permanent or is secure for at least several weeks or for a time period that is very long as compared with the average period between successive messages. It can be stored in a table or can preferably be determined dynamically by encrypting the MSISDN identification with a secret electronic key. Only the operator of the first exchange 2 knows this correspondence resp. the key. Normally, this exchange is administered by the operator of the mobile radio network in which the sender 1 is registered. There is thus a contractual relationship between the sender 1 and this operator, so that most users do not consider it necessary for their messages to remain anonymous vis-á-vis this administrator. This is in particular the case because the message 201 is not destined for this operator and remains mostly incomprehensible to him.

If the exchange 2 is administered by the operator of the mobile radio network, a change of telephone number is possible, for example a change in the telephone numbering plan or following a subscriber's change of subscription. In this case, the correspondence between the former MSISDN and the alias identification CID is replaced with a correspondence between the new MSISDN and the same alias identification.

The further exchange 3 thus receives only an anonymous message 203 that it cannot assign to a specific sender 1. It can however conduct statistical analyses on the bases of the messages 203 from different senders 1.

The receiver 4 can answer a particular message 205 of an anonymous sender by sending a corresponding message (not represented) to the further exchange 3 in which the alias identification is contained. This answer is forwarded by the further exchange 3 to the first exchange 2, which replaces again the alias identification with the identifying features (for example the MSISDN) of the sender 1 and can thus forward the answer to the sender 1.

It is often desirable for the message 201 of the sender 1 to remain anonymous only vis-á-vis the further exchange 3 but not towards the receiver 4. This is in particular the case if the performed service or its price conditions depend on the sender's identity or if the answer cannot be sent over the same reverse channel over the exchanges 3, 2 (for example if a product has to be delivered by post). Service providers 4 also often have their own customer database in which customer profiles are stored. The profile can for example determine which sender 1 may enjoy which conditions and what the customer's preferences are. Both the service providers 4 as well as the senders 1 wish for messages transmitted over the described anonymous channel over the exchanges 2, 3 to be handled as other messages. It is often also wished that only the receiver 4 should be responsible for the quality of the business relationship to the sender 1.

According to the invention, these aims are achieved by the first alias identification CID used by the first exchange 2 being replaced in the further exchange 3 with another identification CMID or with identifying features that are sufficient for the receiver 4 for identifying the sender 1 (step 204). The other identification CMID, which corresponds to a first alias identification CID, is preferably dependent on a receiver 4 identified with a MID. As will be seen later, only the receiver 4 can associate the sender 1 with the corresponding CMID; for the exchange 3, the new alias identification CMID remains just as anonymous as the first alias identification CID.

The receiver 4 thus receives a message 205 in which are contained at least the request L and an alias identification CMID it can comprehend. From this alias identification CMID it can derive a meaningful indication C, for example the customer number. It can thus perform the required service by sending a message either through the exchanges 2, 3 or directly to the sender 1 (step 206). Apart from messages, it can also supply other services or even products over different reverse channels to the sender 1.

We will now describe with the aid of FIG. 1 how the sender 1 registers with the further exchange 3 in order to determine the correspondence between the first alias identification CID and the other alias identification CMID understandable to the receiver, without communicating his identity to the further exchange 3.

In order to have a new customer 1 registered, the receiver 4 first requires a secret TT from the further exchange 3 (arrow 101). The secret TT can be for example a number or an alphanumerical string, that is e.g. generated by a random generator in the further exchange 3, temporarily stored and sent to the receiver 4 (arrow 103). This secret TT is stored by the receiver 4 during a limited period of time and communicated to the sender 1 over a direct channel, for example by SMS, by post, orally, at the desk etc. This transmission must be able to be considered confidential. The further exchange stores the correspondence between the secret TT and the receiver 4 identified with a service provider number MID (arrow 102).

Within the framework of the invention, an unambiguous secret could also be generated by the receiver 4 or the sender 1 and kept anonymous vis-á-vis the further exchange 3.

In order to register, the sender 1 sends a registration message 105 to the first exchange 2. The registration message 105 is preferably sent as other messages, for example as USSD message, SMS or SS7 signaling data. The secret TT agreed upon with the receiver is contained in the message 105.

The first exchange 2 handles the registration message 105 like all other messages and replaces the sender-identifying data MSISDN with a first alias identification CID (step 106). If no alias identification corresponds to this MSISDN, a new correspondence is generated and stored permanently. In all further messages from this sender, the MSISDN will be replaced with the same alias identification.

The adapted registration message 107 is then forwarded to the further exchange 3. This installation recognizes the secret TT and thus knows that this message must be forwarded to the receiver MID (arrow 109). If the secret TT is unknown to the further exchange 3, the registration message must contain the receiver's identification MID. The secret TT has properties allowing the further exchange 3 to recognize the receiver 4. For example, a table in the exchange 3 can be provided in which a correspondence between each secret and the different receivers 4 is stored. Alternatively, predefined series of secrets can be associated with specific receivers.

The exchange 3 then replaces the first alias identification CID with a newly generated alias identification CMID dependent on the receiver MID (arrow 108). This correspondence is stored so that in all future messages, the alias identification CID is replaced with the same CMID. The further exchange 3 also stores a table in which all future messages of the sender 1 recognized on the basis of the alias identification CMID must be sent to the receiver CID.

The registration message 109 with the new alias identification CMID and the secret TT is then forwarded to the receiver 4. The receiver recognizes the secret TT as long as it is still valid and thus knows that the received registration message 109 originates from the sender 1 identified with the user number C. It can thus recognize and store the correspondence between its user number C and the alias identification CMID used by the second exchange 3. Since in all future messages of this sender 1 the same alias identification is used for the same receiver 4, it can also recognize the origin of future anonymized messages.

In case the first alias identification CID is not confidential, it is also possible in a variant embodiment of the invention not to replace it in the further exchange 3 and to forward the messages 205 and 109 with the first alias identification CID to the receiver 4. In this embodiment, the first alias identification is replaced only at the receiver's 4 with the identification C which sufficiently identifies the sender 1 for the receiver 4.

Further provided is a computer product that can be loaded in the internal memory of a digital computer system and in which programs are stored that cause the computer system to carry out any of the methods described herein when the program is run.

The invention claimed is:

1. A method for securely transmitting a message through a telecommunication network, said method comprising the steps of:
    registering, in advance, a correspondence between at least one alias identification and qualifying features of a sender via a communication between the sender and a receiver, wherein the qualifying features are sufficient for the receiver to identify the sender;
    an exchange, separate from the sender and the receiver, replacing sender identifying features in the message with said alias identification, prior to the message being received by the receiver; and
    the receiver identifying the sender by matching said alias identification with said qualifying features, wherein
    said correspondence between the identifying features and said alias identification is secure for time period that is long as compared with the average period between successive messages between the sender and the receiver.

2. The method of 1, wherein the correspondence between said alias identification and said qualifying features is determined said registration step by the sender sending to the receiver a registration message with a secret agreed upon between the receiver and the sender.

3. The method of claim 2, wherein said secret is transmitted over a non-anonymized transmisssion channel between the sender and the receiver.

4. The method of claim 1, herein said alias identification is anonymous vis-á-vis further exchanges.

5. The method of claim 4, wherein the identifying features of the sender are replaced with a first alias identification in a first exchange between the sender and the receiver, and wherein the first alias identification is replaced with a second said alias identification in a second exchange between the first exchange and said receiver.

6. The method of claim 2, wherein said secret is generated by one said exchange.

7. The method of claim 6, wherein said registration message is transmitted by said one said exchange on the basis of said secret to the receiver.

8. The method of claim 2, wherein said secret has a limited validity period.

9. The method of claim 1, wherein the sender is a mobile radio telephone and wherein the identifying features are stored in an identification card in the mobile radio telephone.

10. The method of claim 9, wherein said message is a USSD message that is transmitted over a USSD handler to said exchange.

11. The method of claim 9, wherein said message is an SMS that is transmitted over a USSD handler to said exchange.

12. The method of claim 9, wherein said message is a signaling message according to SS7 in an ISDN network.

13. The method of claim 9, wherein at least one said exchange is administered by the operator of the mobile radio network in which said mobile radio telephone of the user is registered.

14. The method of claim 1, wherein the location of said sender is determined at the sender's or in one said exchange and copied into said message.

15. The method of claim 5, wherein said further exchange performs marketing statistics on the basis of said anonymized messages.

16. The method of claim 15, wherein said receiver is a service, product or financial provider.

17. The method of claim 15, wherein said receiver can supply a service, a product or a financial service over a direct channel between the receiver and the sender.

18. The method of claim 1, wherein: a secret is agreed upon during said registration procedure between the receiver and the specific sender, the sender sends a registration message in which said secret is contained, the receiver receives said registration.

19. The method of claim 18, wherein said secret has a limited validity period.

20. The method of claim 1, wherein said time period is finite.

21. A method securely transmitting a message through a telecommunication network from a sender to a receiver, said method comprising the steps of:
    registering the sender with the receiver; and
    replacing sender identifying features in the message with an alias identification, prior to the message being received by the receiver via an indirect channel, wherein
    said registration includes the steps of:
        over a direct channel, in a confidential manner, the sender providing the receiver with qualifying features that are sufficient for the receiver to identify the sender,
        over the direct channel, in the confidential manner, the receiver providing the sender with a secret, and
        over the indirect channel, the sender sending a registration message to the receiver, said registration message including both said secret and having the sender identifying features replaced with said alias, prior to the message being received by the receiver, wherein
        said receiver uses said secret to set up a correspondence between said alias and the qualifying features that were previously received, thereby allowing identification of the sender by the receiver.

22. A computer product that can be loaded in a memory of a digital computer system and in which programs are stored that cause said computer system to carry out the method of any one of claims 1 and 21 when said program is run.

23. A system for performing the method of any one of claims 1 and 21 for allowing the transmission of messages between a plurality of senders and at least one receiver according to said method.

24. The system of claim 23, with a first exchange in which a correspondence between identifying features of the senders and an anonymous alias identification is stored, and with a further exchange in which a correspondence between said anonymous alias identification and said alias identification associated by the receiver with the senders is stored.

25. The system of claim 24, wherein said senders are mobile radio telephones, and wherein said first exchange is a message handler administered by the operator of the mobile radio network.

26. The method of 21, wherein said replacing step includes the steps of:
   a first exchange receiving the message from the sender and replacing the identifying features in the message with a first alias;
   a second exchange receiving the message from the first exchange and replacing the first alias with a second alias; and
   the receiver receiving the message from the second exchange, wherein
   the correspondence between said alias and the qualifying features is accomplished by a mapping of said second alias with the qualifying features.

27. The method of claim 26, wherein said first exchange receives the message from the sender via a first network, and wherein the second exchange receives the message from the first exchange via a second network.

28. A communication system facilitating secure communication between a sender and a receiver, said system comprising:
   at least one communication network; and
   means for replacing sender identifying features in the message with at least one alias identification prior to the message being received by the receiver, wherein a correspondence between the at least one alias identification and qualifying features of the sender are registered in advance, wherein the qualifying features are sufficient for the receiver to identify the sender when the receiver receives a communication from the sender with said alias identification.

29. A method for a sender to securely transmit a message to a receiver, said method comprising the steps of:
   registering a correspondence between at least one alias identification and qualifying features of a sender via a communication between the sender and the receiver, said registering including the steps of:
      over a first channel, in a confidential manner, the sender providing the receiver with the qualifying features that are sufficient for the receiver to identify the sender,
      over the fist channel, in a confidential manner, the receiver providing the sender with a secret, and
      over a second channel, the sender sending a registration message to the receiver, said registration message including both said secret and having the sender identifying features replaced with said alias, prior to the message being received by the receiver;
   the sender sending a message with the sender identifying features to an exchange, separate from the sender and the receiver, via the second channel;
   the exchange replacing the sender identifying features in the message with said alias identification, prior to the message being received by the receiver; and
   the receiver identifying the sender by matching said alias identification with said qualifying features.

* * * * *